JOSEPH CRAGG.
Improvement in Coffee Pots.
No. 120,417. Patented Oct. 31, 1871.
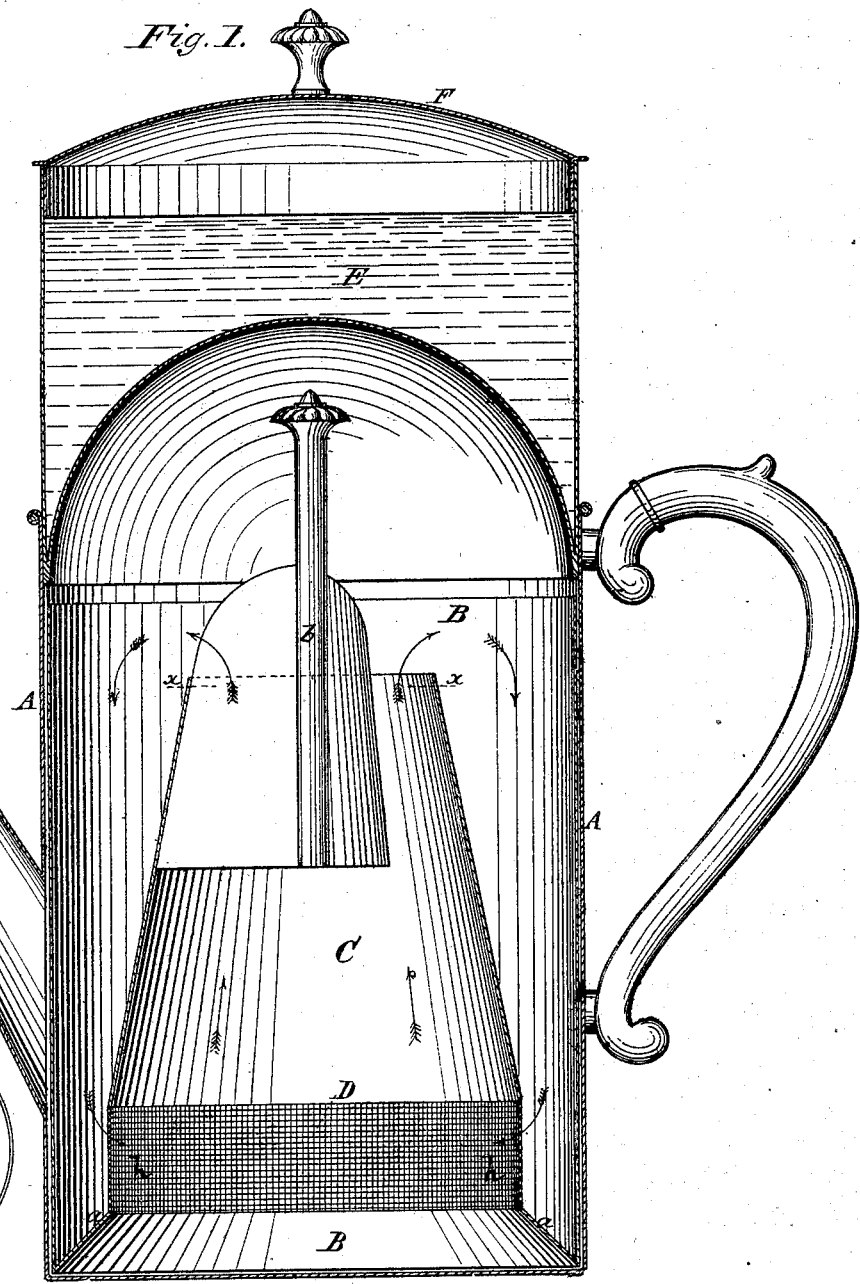

UNITED STATES PATENT OFFICE.

JOSEPH CRAGG, OF BALTIMORE, MARYLAND.

IMPROVEMENT IN COFFEE-POTS.

Specification forming part of Letters Patent No. 120,417, dated October 31, 1871.

*To all whom it may concern:*

Be it known that I, JOSEPH CRAGG, of the city and county of Baltimore and State of Maryland, have invented certain Improvements in Coffee and Tea-Pots, of which the following is a specification:

This invention relates to an improvement in coffee and tea-pots, by which the coffee or tea is purified or clarified of the grounds and sediment and the full strength is taken out of the same; and it consists in a new construction and arrangement of parts, which is described in the following specification, enabling others skilled in the art to make and use the same.

In the accompanying drawing, Figure 1 is a vertical section of my improved coffee-pot. Fig. 2 is a section on $x\ x$, showing the supports of the lower tray or strainer. Fig. 3 is a modification of the handle of the strainer.

In the drawing, A represents a coffee or tea-pot of any suitable shape or size, into which the strainer B is placed. This strainer is of a novel construction, being provided with the cylinder or conical partition C, to which is secured, at its lower end, a piece of perforated metal or wire-screen, D, of cylindrical shape, to the end of which is secured the bevel piece $a$, by which it is connected to the outer cylinder B' of the strainer. At the upper part of the cone C is secured, by three radial arms, $c\ c\ c$, the handle $b$, by which the whole strainer B can be taken out for cleaning. Into the upper part of the coffee-pot is fitted the tray E, having its lower side of a hemispherical or elliptical shape. The tray or receptacle E is filled with cold water and the lid or cover F is placed thereon.

The operation is as follows: The ground coffee or tea being placed in the pot A, the strainer being in the bottom, water is poured thereon and the tray E placed in its position, being filled with cold water, and the cover or lid F placed thereon. The pot is then placed upon the stove, and as the liquid commences to boil the grounds will rise in the inner partition C, pass over its edge and fall to the bottom $a\ a$, as shown by the arrows. In a short time the entire grounds will have boiled over the top of the partition C and become packed in the space over $a\ a$, the coffee continuing to circulate through the perforated metal D, and thereby the entire strength is taken out of the grounds or tea-leaves. The cold water in the tray E condenses the steam from the coffee, assists in the circulation, and prevents the aroma and steam from passing out of the pot. After the grounds have all passed over the edge of the partition C and the coffee has continued to circulate for some time through the grounds and strainer, which will be indicated by the water boiling in tray E, the entire strainer with said grounds is taken out, cover F put on the pot, and the coffee is done. The object of beveling the lower part of the strainer, as shown at $a$, is that the finest particles of coffee-grounds may settle in the small part thereof; and it also assists in the circulation, as the lower edge coming in closer contact with the heat, tends to throw the water upward and inward, forming a void in front of the strainer. If it is desirable to hurry the boiling or making of coffee, a conical piece, $b'$, may be secured on the handle $b$; the water is then put in the pot first, and when the ground coffee is placed into the pot it will slide into the outer space immediately, obviating the necessity of boiling over the edge of cone C from the bottom of the pot. The coffee, of course, circulates then through the strainer as in the other instance.

Having thus described my invention, what I claim, and desire to secure by Letters Patent, is—

1. The strainer B having the internal cylinder or partition C, perforated metal D, bevel rim $a\ a$, arms $c\ c\ c$, and handle $b$, substantially as herein set forth.

2. In combination with the foregoing, the pot A, substantially as described.

JOSEPH CRAGG.

Witnesses:
THOS. D. HARRISON,
T. W. McCOMAS.

(136)